United States Patent [19]
Vezzalini et al.

[11] Patent Number: 5,760,390
[45] Date of Patent: Jun. 2, 1998

[54] ELECTRO-OPTICAL DEVICE FOR DETECTING THE PRESENCE OF A BODY AT AN ADJUSTABLE DISTANCE, WITH BACKGROUND SUPPRESSION

[75] Inventors: Alessandro Vezzalini; Marco Landolfi, both of Bologna, Italy; Reiner Brandstetter, Neuffen, Germany

[73] Assignee: Datalogic S.p.A., Di Reno, Italy

[21] Appl. No.: 831,602

[22] Filed: Apr. 10, 1997

[30] Foreign Application Priority Data

Apr. 12, 1996 [IT] Italy ................... MI96A0702

[51] Int. Cl.[6] ................................................ B01V 9/04
[52] U.S. Cl. ........................ 250/221; 250/239; 350/556
[58] Field of Search ............................ 250/221, 222.1, 250/239; 340/555–557

[56] References Cited

U.S. PATENT DOCUMENTS

| | | |
|---|---|---|
| 3,491,334 | 1/1970 | Martin . |
| 4,282,430 | 8/1981 | Hatten et al. ............... 250/221 |
| 4,306,147 | 12/1981 | Fukuyama et al. .......... 250/239 |
| 4,659,922 | 4/1987 | Duncan ....................... 250/221 |
| 4,782,224 | 11/1988 | Haas et al. ................... 340/556 |
| 5,446,281 | 8/1995 | Taranowski et al. ........ 250/239 |

FOREIGN PATENT DOCUMENTS

| | | |
|---|---|---|
| A-0 198253 | 10/1986 | European Pat. Off. . |
| A0546323 | 6/1993 | European Pat. Off. . |
| A 2429442 | 1/1980 | France . |
| A 3004691 | 8/1980 | Germany . |
| 4115013C1 | 5/1992 | Germany . |

OTHER PUBLICATIONS

Patent Abstracts of Japan, vol 18, No. 493 (E–1606), 14 Sep. 1994.

*Primary Examiner*—Stephone B. Allen
*Attorney, Agent, or Firm*—Nixon & Vanderhye, P.C.

[57] ABSTRACT

An electro-optical device for detecting the presence of a body at an adjustable distance, with the suppression of background, comprises an emitter of a beam of light endowed with a source of a beam of direct light and with an optical transmission chamber and a receiver endowed with an optical reception chamber with a beam of reflected light and with a pair of side by side photoelectric sensors. The source of light and the pair of photoelectric sensors are integral with a supporting structure; the optical reception chamber is mobile and is rotatably supported by the supporting structure by means of pivots having axis substantially coincident with a separation area interposed between the photoelectric sensors.

8 Claims, 4 Drawing Sheets

ELECTRO-OPTICAL DEVICE FOR DETECTING THE PRESENCE OF A BODY AT AN ADJUSTABLE DISTANCE, WITH BACKGROUND SUPPRESSION

This application is based on application No. MI96 A 000702 filed in Italy, the content of which is incorporated hereinto by reference.

The present invention relates to an electro-optical device for detecting the presence of a body at an adjustable distance, with the suppression of background.

Electro-optical devices capable of indicating the presence or the absence of a body in a given area, with the suppression of background, are known. These are electro-optical devices, of the photocell type, which allow the adjustment of the distance within which detection takes place through a manual setting, thus eliminating spurious influences of other objects, or background, beyond such distance.

These devices comprise substantially an emitter of a beam of direct light and a receiver of a beam of reflected light. The emitter of the beam of direct light comprises a source of the beam of light, consisting of an electroluminescent diode, and an optical transmission chamber containing a transmission lens capable of emitting the beam of light towards the body to be detected. The receiver of the reflected beam of light comprises an optical reception chamber, containing a reception lens and some side by side photoelectric sensors. The photoelectric sensors are operatively connected to an electrical measuring circuit capable of emitting an electrical signal in relation to the distance of the body from the source of light.

The operation of these devices is based on the principle of triangulation. The beam of light irradiated by the emitter is directed on to the body (target) to be identified, part of the light received by the body is reflected and, through the reception lens, is directed towards the photoelectric sensors of the receiver. A right-angled triangle is thus defined, the catheti of which are formed by the distance between the source of light and the body and the distance between the source of light and the photoelectric sensors, while the hypotenuse is formed by the distance between the body and the photoelectric sensors. This triangle allows the geometric definition of the maximum detection distance of the bodies, that is to say the distance beyond which the device is not triggered by bodies that may be present (background).

The Japanese patent application JP-A-06168652 describes a photoelectric switch of the type with adjustment of distance, wherein an electroluminescent diode and a transmission chamber comprising a lens, are fixed to a housing. A chassis, that supports a reception chamber containing a lens and a photosensitive element, is mounted rotatable in said housing. The chassis is driven to rotate by means of a worm screw and a cam so as to vary the angle between the axis of projection of the light and the axis of reception of the light.

The main drawbacks of this photoelectric switch derive from the fact that the photosensitive element is mobile, since the chassis is rotatable, and, thus, the electrical connections which connect it to a source of electrical energy and to an electrical control circuit are also mobile. It is well-known that mobile electrical connections involve construction difficulties and are critical in operation so that they have a negative influence on the reliability of the apparatus.

These drawbacks are not present in the electro-optical sensor such as that of the U.S. Pat. No. 4,782,224, comprising a housing wherein a transmitter of a beam of direct light and a receiver of a beam of reflected light are arranged side by side. A transmission lens with a respective luminescent diode, a reception lens and a photoelectric converter device, formed by two photoconverters, are integral with the housing. The sensor comprises a deflection mirror hinged in the housing associated either with the reception lens or with the transmission lens. By means of the rotating mirror the beam of reflected light, passing through the reception lens, is deflected towards the photoelectric converter device or the beam of direct light is directed, through the transmission lens, towards an article to be detected, so that it is possible to vary the distance of detection by rotating the deflection mirror.

This sensor, however, exhibits other drawbacks.

The main disadvantages of this sensor derive from the presence of the rotating deflection mirror and of the fixed lenses.

The mirror, in fact, though it may be built well, gives rise to diffraction, attenuation of the signal and a worsening of focus.

Moreover, in the case wherein the mirror is associated with the reception lens, the axis of reception of the beam of reflected light coincides with the optical axis of the reception lens only for large distances of the objects to be detected, while for limited distances the two axes diverge; the same takes place for the axis of projection of the beam of direct light and for the optical axis of the transmission lens, in the case wherein the rotating mirror is associated with the transmission lens.

Lastly, the mirror constitutes an additional optical component which involves an increase in the costs of production of the sensor.

It has now been found that the above mentioned drawbacks can be overcome with an electro-optical device for detecting the presence of a body at an adjustable distance, with the suppression of background, comprising a) an emitter of a beam of light comprising a source of a beam of direct light and an optical transmission chamber endowed with a transmission lens having a respective focus, capable of directing said beam of direct light towards said body, b) a receiver suitable for intercepting a beam of light reflected by said body comprising an optical reception chamber of said beam of reflected light, endowed with a reception lens having a respective focus, and photoelectric sensor means, c) a structure for supporting said emitter and receiver, and d) a control circuit operatively connected to said photoelectric sensor means, capable of processing a signal from said sensors, e) said optical reception chamber being mobile with respect to said supporting structure and being operatively connected to adjustment means for adjusting the position of said optical chamber, characterized in that f) said photoelectric sensor means comprise a pair of side by side photoelectric sensors between which there is interposed a separation area, g) said source of light and said pair of photoelectric sensors are integral with said supporting structure, and h) said reception chamber is rotatably supported by said supporting structure by means of first pivot means having axis of rotation substantially coincident with said separation area interposed between said photoelectric sensors so that said focus of said reception lens substantially coincides with said separation area for any position assumed by said reception chamber in order to determine a maximum detection distance beyond which no body is detected.

According to a preferred embodiment of the invention, said transmission chamber is also mobile and it is operatively connected to said adjustment means, said transmission chamber being rotatably supported by said supporting structure by means of second pivot means having axis of rotation intersecting said focus of said transmission lens so that said focus of said transmission lens lies substantially on said axis of rotation of said second pivot means for any position assumed by said transmission chamber in order to determine said maximum detection distance.

According to another preferred embodiment of the invention, said transmission chamber is mobile and operatively connected to said adjustment means, said transmission chamber being endowed with third pivot means slidably supported in a slot of said supporting structure so as to execute rototranslatory movements.

In the electro-optical device of the invention, both the source of light and the pair of photoelectric sensors are fixed. This allows them to be connected to a source of electrical energy and to an electrical control circuit by means of fixed electrical connections.

Thus, all the construction difficulties encountered with the mobile connections are eliminated and the reliability of the device is enhanced.

Moreover, whatever the set distance is, the focus of the reception lens always coincides with the area of separation of the photodiodes, that is to say the axis of reception of the beam of reflected light always coincides with the optical axis of the reception lens, for any position assumed by the reception chamber.

In the same way, in the case of a rotating transmission chamber, the focus of the transmission lens always lies on the axis of rotation of the transmission chamber, that is to say the axis of projection of the beam of direct light also coincides with the optical axis of the transmission lens, for any relative position assumed by the transmission chamber and by the reception chamber to determine the maximum detection distance.

Thus, the receiving and the transmission lenses are always employed in the best possible manner.

Features and advantages of the invention will now be illustrated with reference to a preferred embodiment represented, as a non-limiting example, in the enclosed drawings, wherein.

Figure 1:
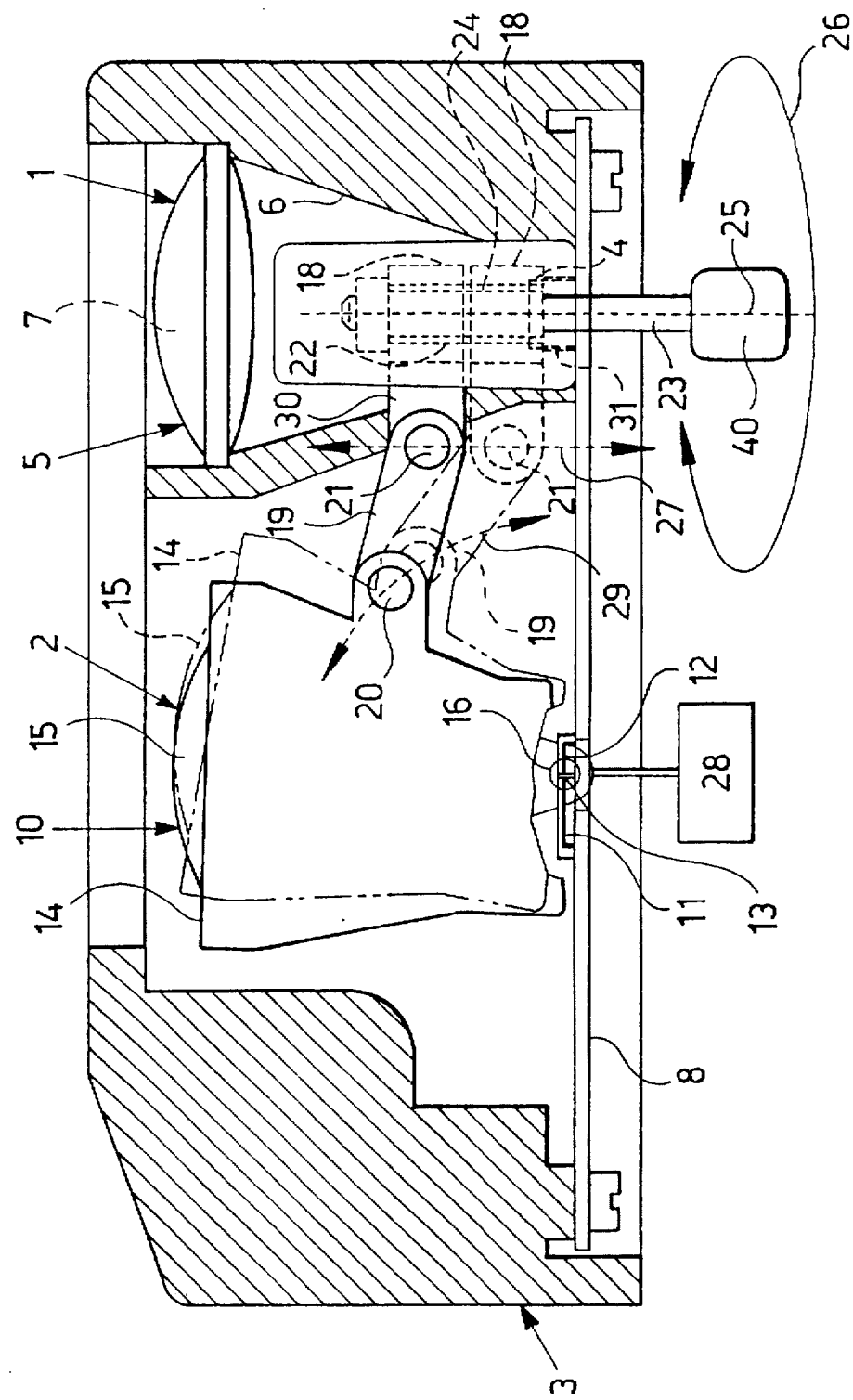
FIG. 1 is a partial cross-sectional view of an electro-optical device for detecting the presence of a body at an adjustable distance, with the suppression of background, made according to the invention.
Figure 2:
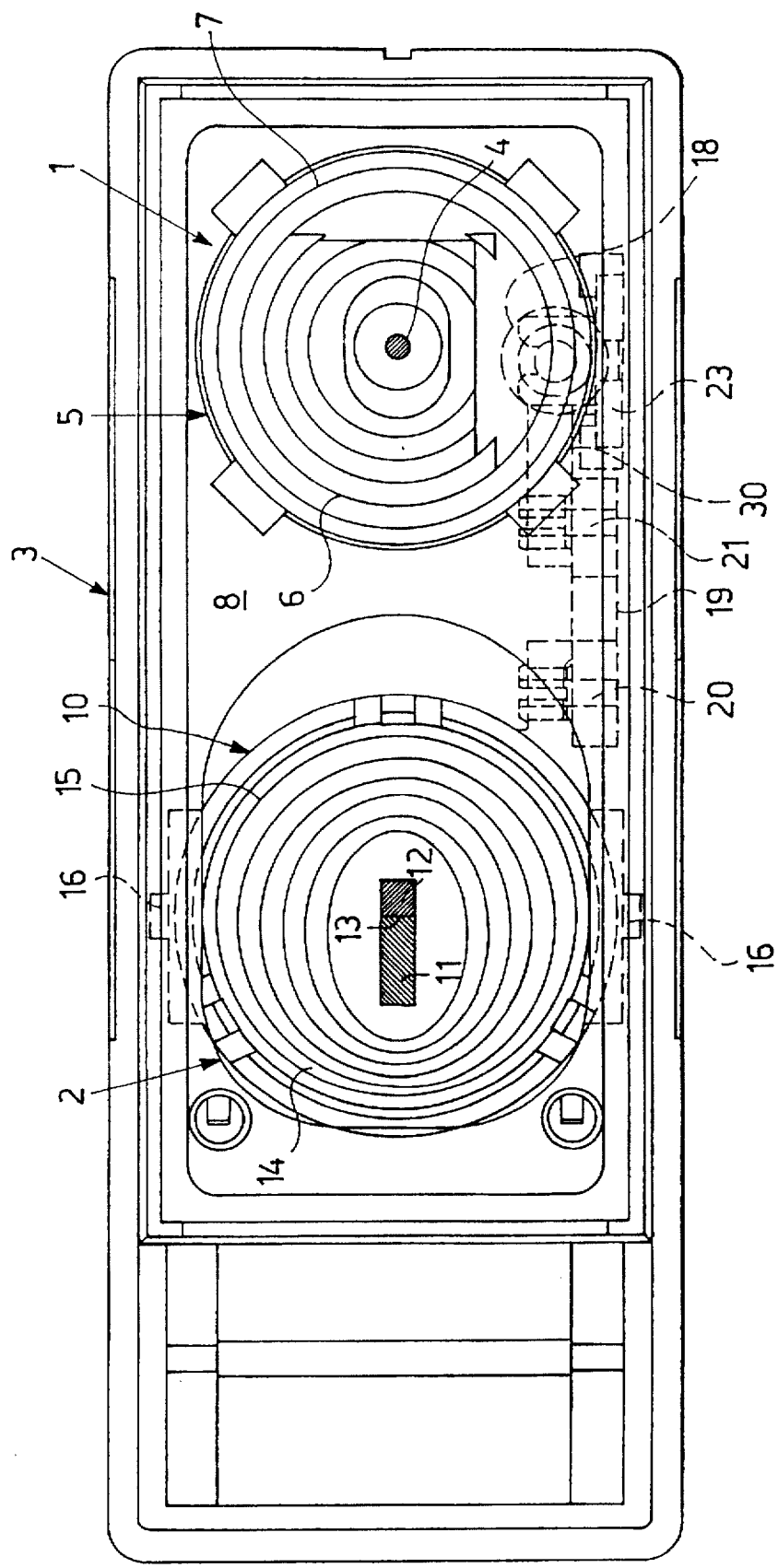
FIG. 2 is a plan view from above of the electro-optical device of FIG. 1.

In FIGS. 1 and 2 is shown an electro-optical device for detecting the presence of a body at an adjustable distance, with the suppression of background, made according to the invention, comprising an emitter of a beam of direct light, indicated overall with 1, a receiver of a beam of reflected light, indicated overall with 2, and a supporting structure 3.

The emitter 1, in turn, comprises a source of light 4 and a fixed optical transmission chamber 5. The source of light 4 consists of an electroluminescent diode mounted on a printed circuit board 8 fastened to the supporting structure 3. The electroluminescent diode 4 emits a beam of light having an axis orthogonal to the board 8. The optical transmission chamber 5 is endowed with an optical cone 6, obtained in the structure 3, and with a transmission lens 7.

The receiver 2 comprises a mobile optical reception chamber 10 and a pair of side by side electro-optical sensors 11 and 12. The sensors 11 and 12 consist of two photodiodes mounted on the printed circuit board 8, between which there is interposed a separation area 13 consisting of a strip of material not sensitive to light. The optical reception chamber 10 is endowed with an optical cone 14 and with a reception lens 15 and is rotatably supported in the structure 3. The optical cone 14 is hinged in the structure 3 by means of pivots 16 having an axis of rotation, that constitutes the fulcrum of the optical reception chamber 10, substantially coincident with the separation strip 13 (FIG. 2). In particular, the axis of rotation of the pivots 16 passes exactly on the strip 13, so that the focus of the reception lens 15 coincides with the separation area 13 between the photodiodes 11 and 12. The optical cone 14 is also connected to a sleeve 18 by means of a rod 19, pivots 20 and 21 and an arm 30.

The sleeve 18 is endowed with an internal thread 22 by means of which it engages a shaft 23 endowed with an external thread 24. The shaft 23 is rotatable mounted in a supporting bush 31 fastened to the supporting structure 3, so that it can be manually operated by means of a knob 40 and it can rotate around an axis thereof 25 in one direction of rotation or in the opposite direction, as indicated by the double arrow 26. The shaft 23 is free to rotate while its axial movements are inhibited. The shaft 23, rotating, causes displacements of the sleeve 18 in the direction of the axis 25, as indicated by the double arrow 27.

The photodiodes 11 and 12 are operatively connected to an electronic control circuit, represented by a block 28. The control circuit 28, not shown in detail, comprises, for example, a differential amplifier and a comparator amplifier which drives a diode emitting visible light (LED) capable of emitting a measurement signal when the device detects the presence of a body.

In order to adjust the device of FIG. 1 so as to predetermine the maximum detection distance of a body, the beam of light emitted by the electroluminescent diode 4 is directed towards the body and the shaft 23 is manually rotated in one of the two directions of the arrow 26. In that way the sleeve 18 slides along the shaft 23 in the direction of the axis 25 (arrow 26) and, through the arm 30 and the rod 19, drives the optical cone 14 and the reception lens 15 to rotate on the pivots 16 in the clockwise or anti clockwise direction, as indicated by the double arrow 29, until the axis of reception of the beam of light reflected by the body and focused by the reception lens 15, is centered on the separation strip 13 and the photodiodes 11 and 12 are illuminated to the same extent. In all the positions the chamber 10 can assume, the axis of rotation of the pivots 16 remains coincident with the strip 13 and with the focus of the lens 15. When the knob 40 and the shaft 23 are rotated so that the photodiode 11 is illuminated slightly more than the photodiode 12, the circuit 28 switches the LED on. This allows the identification of the point of intersection of the axis of projection of the beam of direct light and of the axis of reception of the beam of reflected light corresponding to the maximum distance beyond which the body is not detected. For example, the sleeve 18 and the pivot 21 move downwards with reference to FIG. 1 (dashed position) and the optical cone 14 and the lens 15 rotate in the clockwise direction (dashed position).

All the bodies situated along the axis of projection of the beam of direct light at a distance less than the maximum, are detected with certainty because the beam of reflected light strikes the photodiode 11 which triggers the control circuit 28 and, in turn, causes the LED to be switched on. When the body moves along the axis of projection of the beam of direct light, from the maximum distance towards the device, the receiving spot is displaced on the diode 11 away from the separation strip 13. This displacement becomes bigger and bigger as the body moves closer to the source of light 4 (electroluminescent diode). For this reason, if it is desired that the LED remains active up to distances of the bodies near to zero, it is necessary for the photodiode 11 to be very long. In order to limit the cost of the photodiode 11, it is possible to use two photodiodes of different length so that the photodiode 11 is longer than the photodiode 12 (which reads far away) or to a twin asymmetrical diode comprising two side by side regions separated by the separation strip 13, where the region more distant from the source of light 4 is longer than the region closer to the source of light.

All the bodies situated at a distance greater than the maximum are not detected because the beam of reflected light strikes the photodiode 12 which emits an electrical signal which inhibits the activation of the control circuit 28 which, in turn, switches the LED off.

The arrangement in which the fulcrum of the reception chamber 10 coincides with the separation strip 13 of the photodiodes 11 and 12 ensures that the distance between the separation strip 13 of the photodiodes 11 and 12 from the reception lens 15 is equal to its focal length and that it remains constant during the rotation of the lens. On the photodiode 11 there is, therefore, the smallest possible spot when the body is far from the electro-optical device: this choice enhances the discrimination at large distances and compensates the drop in performance due to the fall in the intensity of the beam of reflected light as the distance of the body increases.

Moreover, whatever the maximum set distance is, the axes of the beams of direct and reflected light are always coincident with the optical axes of the emission lens 7 and of the reception lens 15, thus the lenses are always used in the best possible manner.

Figure 3:
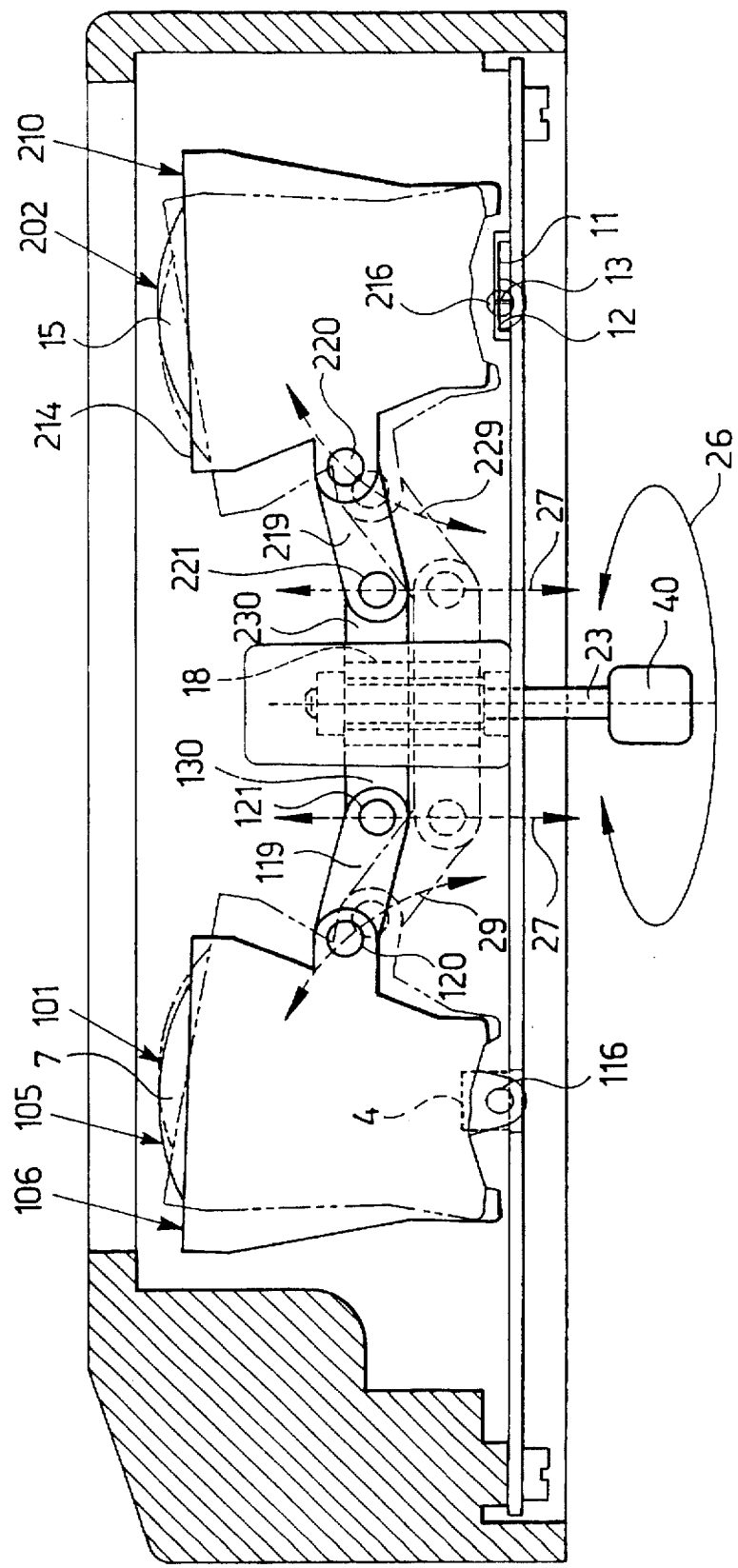
FIGS. 3 and 4 show variants of the electro-optical device of FIG. 1.

In FIG. 3 is shown a variant of the photo-optical device of FIGS. 1 and 2, wherein an optical transmission chamber 105 of an emitter of the beam of direct light 101 and an optical reception chamber 210 of a receiver of a beam of reflected light 202 are mobile. The optical transmission chamber 105 is endowed with the lens 7 and with an optical cone 106 hinged in the structure 3 by means of pivots 116 having axis of rotation intersecting the focus of the lens 7 so that the focus of the lens lies on the axis of rotation of the transmission chamber. The optical cone 106 is operatively connected to the sleeve 18, driven by the threaded shaft 23, by means of a rod 119, pivots 120 and 121 and an arm 130. The optical reception chamber 210 is endowed with the lens 15 and with an optical cone 214 hinged in the structure 3 by means of pivots 216 having axis of rotation coincident with the separation strip 13. The optical reception chamber 210 is connected to the sleeve 18 by means of a rod 219, pivots 220 and 221 and an arm 230.

In this case, by rotating the knob 40 and, thus, the shaft 23, both the optical emission chamber 105 and the optical reception chamber 210 rotate around the respective pivots 116 and 216 (arrows 29 and 229) so that the point of intersection of the axis of projection of the beam of direct light and of the axis of reception of the beam of reflected light is adjusted with a combination of two movements which allows the accurate measurement in a range of distances which is more extensive with respect to the device of FIG. 1.

The rods 119 and 219 shown in FIG. 3 have the same length, but they can also have different lengths.

In the device of FIGS. 1 and 2 and in that of FIG. 3 a beam of direct light with parallel rays is generated, because the source of light 4 is placed in the focus of the transmission lens 7. In this way, the spot which strikes the body to be detected has always the same dimensions whatever the distance of the body from the source of light 4 is, from the minimum to the maximum detectable.

Figure 4:
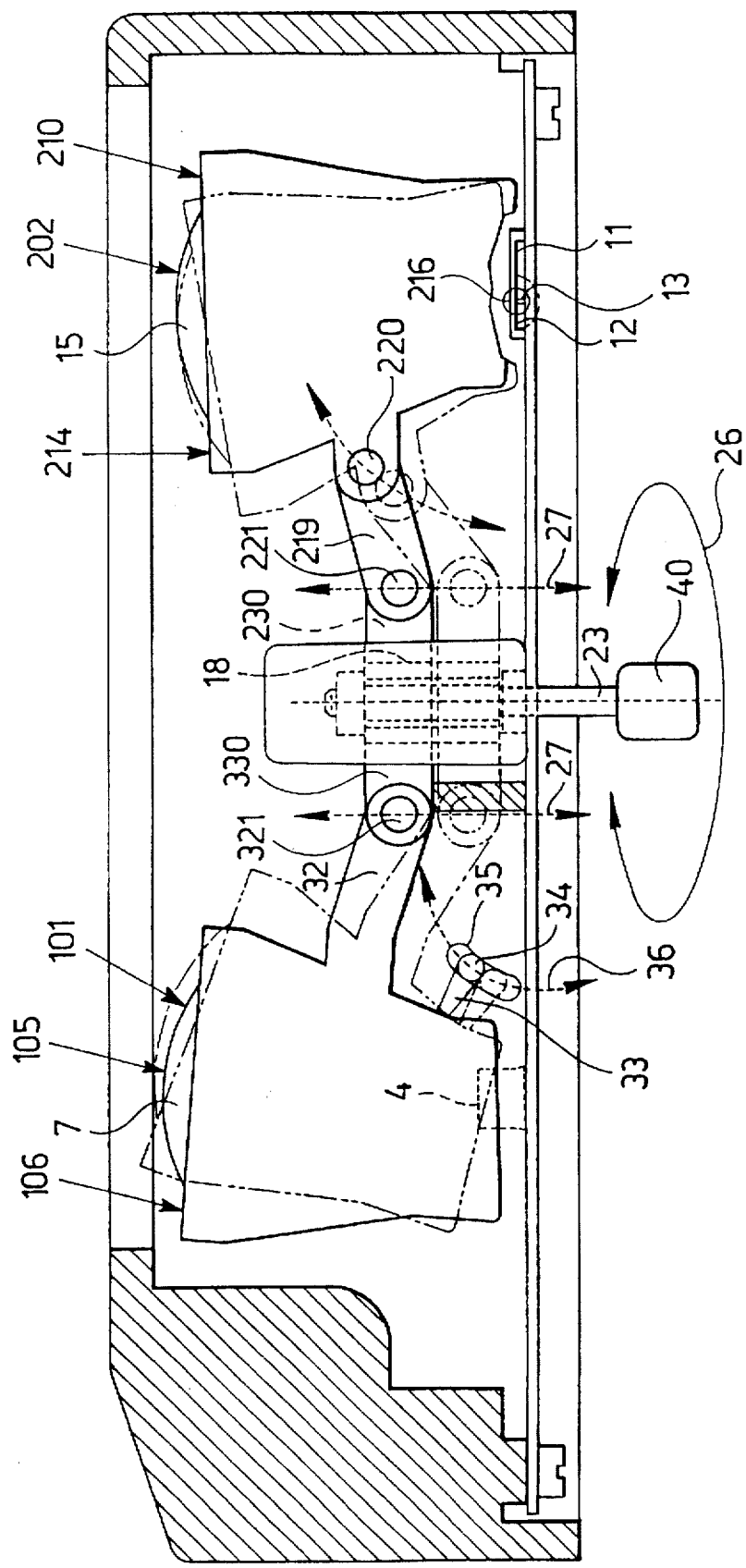

In FIG. 4 is shown a variant of the electro-optical device of FIG. 3, wherein the optical cone 106 is integral with an arm 33 provided with a roller 34 which is engaged in a curved slot 35 obtained in a wall of the structure 3. Moreover, the optical cone 106 is operatively connected to the sleeve 18, driven by the threaded shaft 23, by means of an arm 32 hinged at 321 to an arm 330.

In this case, by executing the adjustment of the position of the optical transmission chamber 105 by means of the knob 40 and of the shaft 23, the optical cone 106 executes a rototranslation (dashed position), guided by the roller 34 which rotates on its axis and runs along the slot 35 (double arrow 36). The rototranslatory movement of the optical transmission chamber 105 allows the enhancement of its ability to direct the beam of light emitted by the electroluminescent diode 4 towards the body to be detected.

In the device of FIG. 4 the transmission chamber 105 executes a rototranslatory movement such that it moves away from the source of light 4 and, therefore, the source of light is no longer situated in the focus of the lens 7. Under these conditions the beam of light from the transmission chamber 105 is no longer with parallel rays, but with convergent rays. With this solution there is the advantage that it is possible to generate spots as small as possible as the body to be detected moves closer to the source of light. This allows the "discrimination" of objects smaller than those which can be detected with the device of FIG. 1, FIG. 2 and FIG. 3, especially at small distances.

We claim:

1. An electro-optical device for detecting the presence of a body at an adjustable distance, with the suppression of background, said electro-optical device comprising a) an emitter of a beam of light comprising a source of a beam of direct light and an optical transmission chamber endowed with a transmission lens having a respective focus, capable of directing said beam of direct light towards said body, b) a receiver suitable for intercepting a beam of light reflected by said body comprising an optical reception chamber of said beam of reflected light, endowed with a reception lens having a respective focus, and photoelectric sensor means, c) a structure for supporting said emitter and receiver, and d) a control circuit operatively connected to said photoelectric sensor means, capable of processing a signal from said sensors, e) said optical reception chamber being mobile with respect to said supporting structure and being operatively connected to adjustment means for adjusting the position of said optical chamber, f) said photoelectric sensor means including a pair of side by side photoelectric sensors between which there is interposed a separation area, g) said source of light and said pair of photoelectric sensors being integral with said supporting structure, and h) said reception chamber being rotatably supported by said supporting structure by means of first pivot means having an axis of rotation substantially coincident with said separation area interposed between said photoelectric sensors so that said focus of said reception lens substantially coincides with said separation area for any position assumed by said reception chamber in order to determine a maximum detection distance beyond which no body is detected.

2. An electro-optical device according to claim 1, wherein:

said transmission chamber is also mobile and is operatively connected to said adjustment means, and said transmission chamber being rotatably supported by said supporting structure by second pivot means having an axis of rotation intersecting said focus of said transmission lens so that said focus of said transmission lens lies substantially on said axis of rotation of said second pivot means for any position assumed by said transmission chamber in order to determine said maximum detection distance.

3. An electro-optical device according to claim 1, wherein:

said transmission chamber is mobile and is operatively connected to said adjustment means, and said transmission chamber being endowed with third pivot means slidably supported in a slot of said supporting structure so as to execute rototranslatory movements.

4. An electro-optical device according to claim 1, wherein:

said mobile reception chamber is operatively connected by means of a first rod, first pivot means and a first arm to a threaded sleeve engaging a threaded shaft rotatably supported by said supporting structure.

5. An electro-optical device according to claim 4, wherein:

said transmission chamber is also mobile and is operatively connected to said adjustment means, and said transmission chamber being rotatably supported by said supporting structure by second pivot means having an axis of rotation intersecting said focus of said transmission lens so that said focus of said transmission lens lies substantially on said axis of rotation of said second pivot means for any position assumed by said transmission chamber in order to determine said maximum detection distance, said transmission chamber being operatively connected by means of a second rod, second pivot means and a second arm to said threaded sleeve engaging said threaded shaft.

6. An electro-optical device according to claim 4, wherein:

said transmission chamber is mobile and is operatively connected to said adjustment means, and said transmission chamber being endowed with third pivot means slidably supported in a slot of said supporting structure so as to execute rototranslatory movements, said mobile transmission chamber being operatively connected by means of third arms and a third pivot means to said threaded sleeve engaging said threaded shaft and is endowed with a fourth arm provided with a roller engaged with a curved slot of a wall of said supporting structure.

7. An electro-optical device according to claim 1, wherein said source of light and said photoelectric sensors are fixed to a printed circuit board.

8. An elector-optical device according to claim 1, wherein said photoelectric sensors include a twin asymmetric photodiode comprising two side by side regions separated by said separation strip formed by a strip of material not sensitive to light, the region more distant from said source of light being longer than the region closer to said source of light.

* * * * *